(12) United States Patent
Morita

(10) Patent No.: US 6,750,452 B1
(45) Date of Patent: Jun. 15, 2004

(54) THERMAL TYPE-INFRARED DETECTION DEVICE AND METHOD FOR MANUFACTURING THE SAME, AND ARRAY OF THERMAL TYPE-INFRARED DETECTION DEVICE

(75) Inventor: Shinichi Morita, Tokyo (JP)

(73) Assignee: IHI Aerospace Co., Ltd., Tokyo (JP)

(*) Notice: Subject to any disclaimer, the term of this patent is extended or adjusted under 35 U.S.C. 154(b) by 0 days.

(21) Appl. No.: 10/411,221

(22) Filed: Apr. 11, 2003

(51) Int. Cl.[7] ............................................... G01J 5/02
(52) U.S. Cl. .................................. 250/338.1; 250/338.4
(58) Field of Search ........................... 250/338.1–338.5; 438/48, 53, 54

(56) References Cited

U.S. PATENT DOCUMENTS 6,040,577 A * 3/2000 Mauduit et al.

6,552,344 B1 * 4/2003 Sone et al.

FOREIGN PATENT DOCUMENTS

| JP | 06-160194 A | 6/1994 |
| JP | 2000-002585 A | 1/2000 |
| JP | 2000-146684 A | 5/2000 |
| JP | 2000-230857 A | 8/2000 |
| JP | 2001-099705 A | 4/2001 |

* cited by examiner

Primary Examiner—Savitri Mulpuri
(74) Attorney, Agent, or Firm—Sughrue Mion, PLLC

(57) ABSTRACT

A thermal type-infrared detection device improved in the sensitivity and the power of output signal without deterioration of strength of the diaphragm, which is provided with a silicon substrate with a concave, a diaphragm made of an insulation material substantially covering the concave of the silicon substrate, an infrared detecting section positioned on the diaphragm, and the silicon substrate is formed with a projection made of a thermal conductor for supporting the diaphragm away from the silicon substrate.

7 Claims, 8 Drawing Sheets

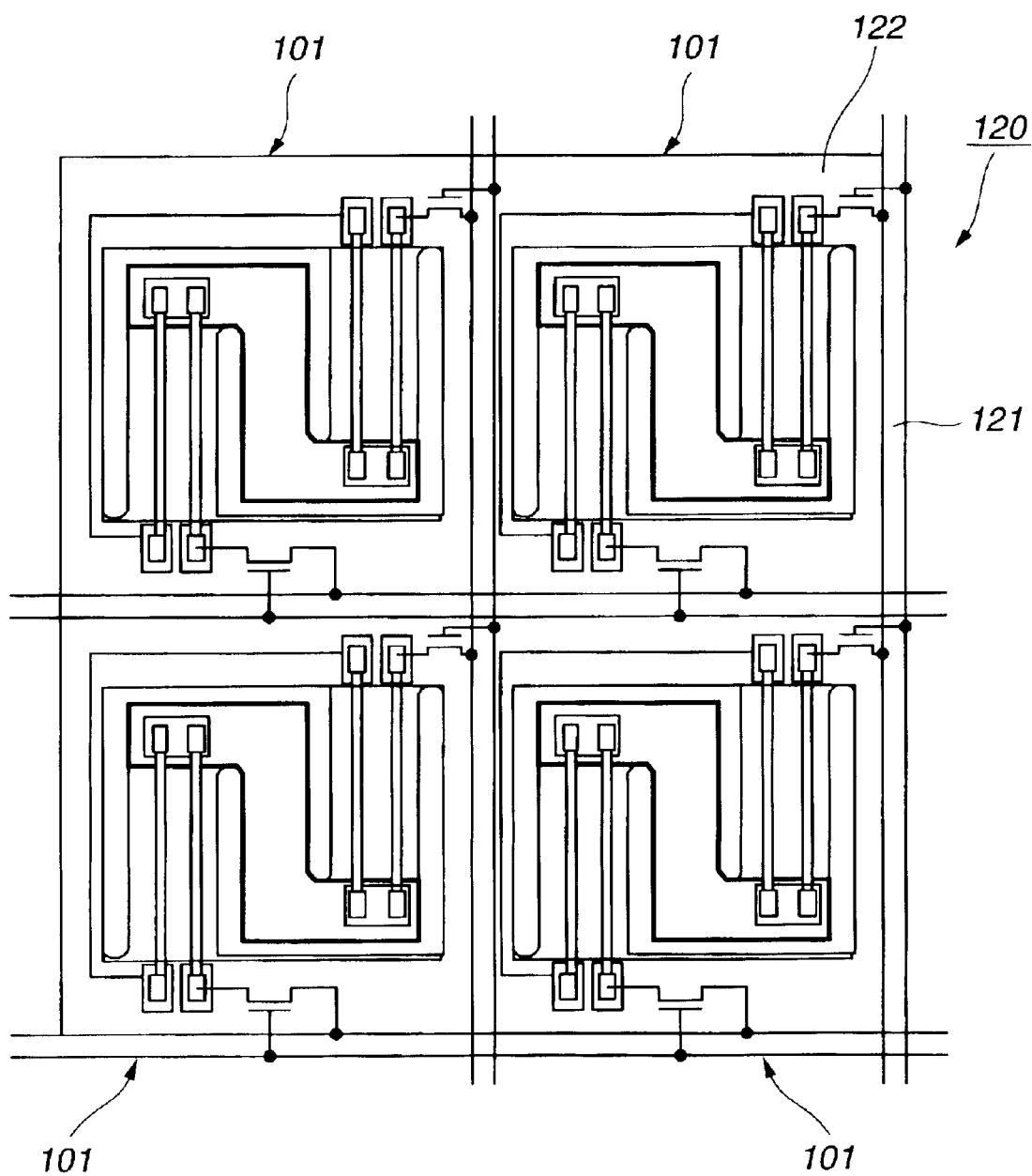

THERMAL TYPE-INFRARED DETECTION DEVICE AND METHOD FOR MANUFACTURING THE SAME, AND ARRAY OF THERMAL TYPE-INFRARED DETECTION DEVICE

BACKGROUND OF THE INVENTION

1. Field of the Invention

The present invention relates to a thermal type-infrared detection device used for non-contact measurement of temperature and prevention of crimes and disasters, a method for manufacturing such the detection device, and an array composed of such the thermal type-infrared detection.

2. Description of the Prior Art

Heretofore, an infrared detection device of thermopile type, pyroelectric type or a bolometer type has been used as the thermal type-infrared detection device as mentioned above, however, an infrared detection section is formed on a diaphragm composed so as to be thermally isolated from a semiconductor substrate for improving the sensitivity in any type of the devices.

Thus, in a case of the thermal type-infrared detection device of thermopile type as an example of the conventional thermal type-infrared detection device, the thermal type infrared detection device 101 has thermal isoplated structure formed through silicon micro-machining technique as shown in FIG. 7.

That is, the thermal type-infrared detection device 101 is provided with a silicon substrate 102 as a semiconductor substrate, a diaphragm 103 made of an insulating material, and an infrared detection section 104 positioned on the diaphragm 103. The silicon substrate 102 is formed with a concave 106 removed by etching the lower part of the diaphragm 103 with silicon etchant infiltrated through an etching aperture 105, accordingly the diaphragm 103 is thermally isolated from the silicon substrate 102 through this concave 106.

The infrared detection section 104 on the diaphragm 103 is provided with a thermopile 110 having a plurality of thermocouples 109 arranged in parallel and electrically connected in series which are composed of n-type semiconductor 107 (e.g. n-type polysilicon) and p-type semiconductor 108 (e.g. p-type polysilicon), and a heat absorption layer 112 stacked on the thermopile 110 through an insulation layer 111. The detection section 104 is so structured as to read an electric signal through lead wires 113 connected with both ends of the thermocouples 109 and made of aluminum or so, and high thermal resisting beam structure is used in order to try to improve the sensitivity of said device 101 in the example shown in the FIG. 7.

In this case, it is possible to apply the method based of surface micro-machining technique using a sacrifice layer, however in any method, the diaphragm 103 has a configuration that the lower part of a cold junction 109C of the thermocouples 109 is formed directly or through a frame-shaped layer on the silicon substrate 102.

Such the infrared detection device 101 forms an array 120 of thermal type-infrared detection device by arranging a plurality of them as shown in FIG. 8. In the thermal type infrared detection device array 120, wires 121 and a device-selection switching mechanism 122 are disposed on the great majority of the substrate area excepting the cold junctions 109C of the thermocouples 109.

However, in the conventional thermal infrared-type detection device as mentioned above, the lower part of the cold junction 109C of the thermocouples 109 is formed directly on the silicon substrate 102, or formed indirectly on the silicon substrate 102 through the frame-shaped layer. Accordingly, the lead wires 113, which are indispensable in the device 101, are distributed in the area of the cold junction 109C of the thermocouple 109 in the case of forming the diaphragm 103 directly on the silicon substrate 102 (the device-selection switching mechanism 122 is disposed in the thermal type infrared detection device array 120), thus, the lead wires 113 and the circuit zone are positioned on the outer peripheral portion of the device, and occupy the greater part of the area assigned for the device.

On the other side, although the wires 113 and the device-selection switching mechanism 122 are disposed at the lower part of the frame-shaped layer in the case of forming the diaphragm 103 on the silicon substrate 102 through the frame-shaped layer, an area out of contact with the cold junction 109C in the area of the frame-shaped layer becomes wider, therefore an area of the heat absorption layer 112, which exert influence directly on the signal of the infrared detection, becomes narrow relatively against the area assigned for the infrared detection device 101. Namely, there is a problem in that an opening rate (hereinafter referred to as "fill factor") of the detection device becomes lower, consequently it may become hard to detect feeble infrared lays, and it is the subject to solve the above-mentioned problem of the conventional infrared detection device.

SUMMARY OF THE INVENTION

The present invention is made in view of the above-mentioned problem in the prior art, and it is an object to provide a thermal type-infrared detection device which is possible to enlarge the occupied area of the heat absorption layer by raising the fill factor and possible to improve the sensitivity and the output signal without lowering the strength of the diaphragm, and a production method of the device of this kind, in addition to an array of thermal type-infrared detection device.

The thermal type-infrared detection device according to this invention is characterized by comprising a semiconductor substrate having a concave, a diaphragm made of an insulating material and substantially covering the concave of the semiconductor substrate, and an infrared detecting section positioned on the diaphragm, the semiconductor substrate is provided with a projection made of a thermal conductor for supporting the diaphragm away from the semiconductor substrate. Such the configurations of the thermal type-infrared detection device serve as a means for solving the aforementioned problem of the prior art.

The thermal type-infrared detection device according to respective embodiments of this invention is characterized in that the thermal conductor is made of a silicon-polycrystalline material or a metallic material, or the device is any one of a thermopile type, a bolometer type, and a pyroelectric type.

Moreover, the production method according to this invention is characterized by comprising the steps of preparing a semiconductor substrate formed with a first insulation layer on the surface thereof, removing a part of the first insulation layer of the semiconductor substrate to form an aperture for anisotropic etching of the semiconductor substrate, stacking an etching sacrifice layer on a whole surface including the first insulation layer on the semiconductor substrate and the aperture of the first insulation layer, stacking a diaphragm and a second insulation layer on the etching sacrifice layer in order, infiltrating etchant into the etching sacrifice layer after taking a measure for making the etching sacrifice layer withstand the etchant at a position to be formed with the projection, etching and removing the etching sacrifice layer excepting the position corresponding to the projection, and removing a part of the semiconductor substrate to form the concave through anisotropic etching by infiltrating anisotropic etchant through the aperture of the first insulation layer on the semiconductor substrate at the time of producing the thermal type-infrared detection device according to this invention. Such the configurations of the production method of the infrared detection device serve as a means for solving the aforementioned problem of the prior art.

Furthermore, the array of thermal type-infrared detection device according to this invention is composed of a plurality of the thermal type-infrared detection devices according to this invention arranged with each other, and the array according to an embodiment of this invention is characterized in that projections adjacent to each other of the respective devices are formed in continuous one body.

In the thermal type-infrared detection device according to this invention, the lead wires of the cold junction area are distributed in the lower part of the infrared detection section, the cold junction area of the infrared detection section positioned on the diaphragm and the semiconductor substrate are thermally connected through the projection made of the thermal conductor in a wall or pillar-shape and disposed discontinuously, accordingly an usable area for the heat absorption layer becomes wider without harming mechanical strength of the diaphragm, and the fill factor is raised drastically, consequently heat absorption energy increases and the output signal becomes larger.

Particularly, it is possible to carry out the etching of the silicon sacrifice layer and the anisotropic etching of the semiconductor substrate at the same time with the same etchant, such as hydrazine for example, by forming the projection made of the thermal conductor in the discontinuous wall or pillar-shape with a silicon material, such as polysilicon, whereby the concave is formed below the diaphragm.

In the production method of the thermal type-infrared detection device according to this invention, the concave is formed by combining the etching for the sacrifice layer and the anisotropic etching for the silicon substrate, therefore the sticking phenomenon between diaphragm and semiconductor substrate is avoided, thereby minimizing the height of the projection thermally connecting the cold junction area and the semiconductor substrate. That is, it is possible to make thermal resistance of the thermal conductor of the projection small and make a temperature difference between cold junction and semiconductor substrate negligibly small.

In the array of thermal type-infrared detection device according to this invention, the switching mechanism for device selection is disposed in the lower part of the infrared detection section and the cold junction area positioned on the diaphragm and the semiconductor substrate are thermally connected through the projection made of the thermal conductor, whereby the diaphragm is form in the same height from the semiconductor substrate and the fill factor is drastically improved without damaging the mechanical strength of the diaphragm.

Moreover, in the array according to preferred embodiment of this invention, the projections adjacent to each other of the respective devices are formed in continuous one body, thereby reducing a useless area between devices and an occupied area of one pixel, and consequently decreasing the cost of the device array.

BRIEF DESCRIPTION OF THE DRAWINGS

FIG. 8 is a top view illustrating the thermal type-infrared detection device array formed by arranging the plurality of conventional detection devices shown in FIG. 7.

DETAILED DESCRIPTION OF THE PREFERRED EMBODIMENT

This invention will be described below on basis of drawings.

Figure 1A:
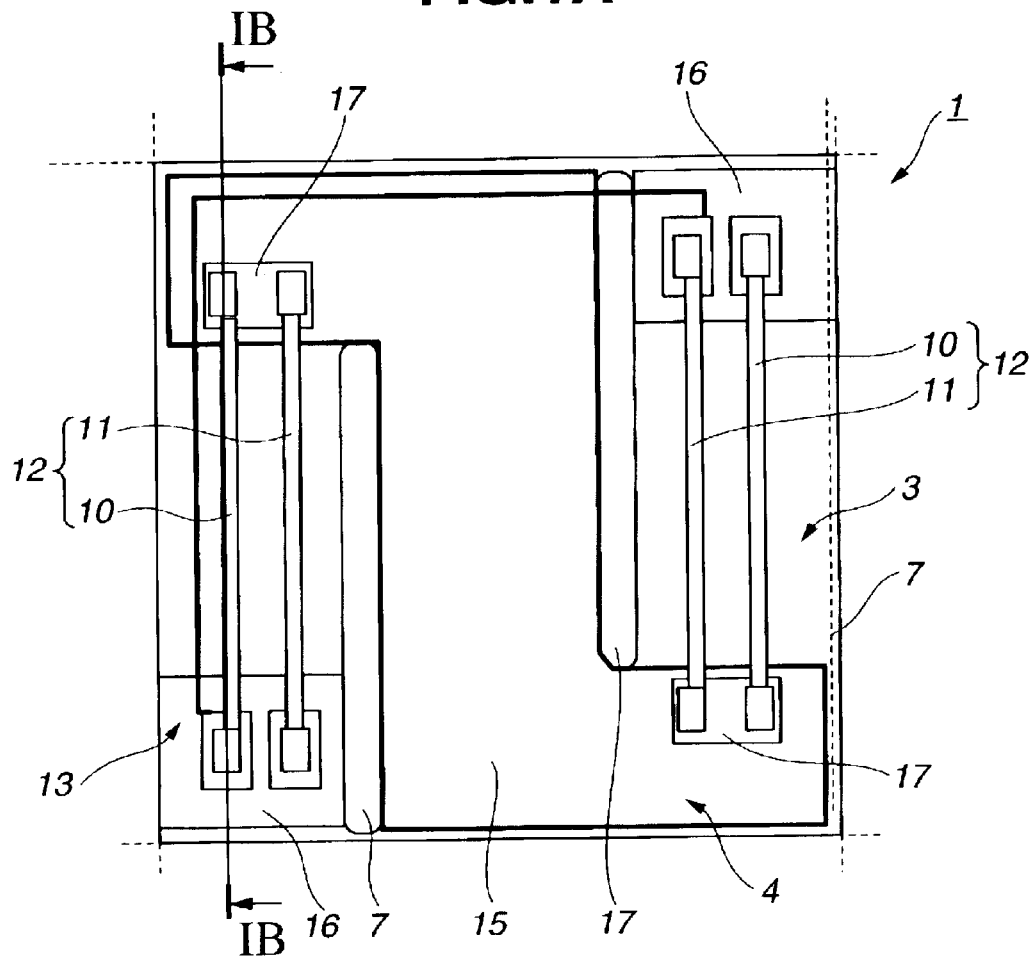
FIG. 1A is a top view illustrating an embodiment of the thermal type-infrared detection device according to this invention.
Figure 1B:
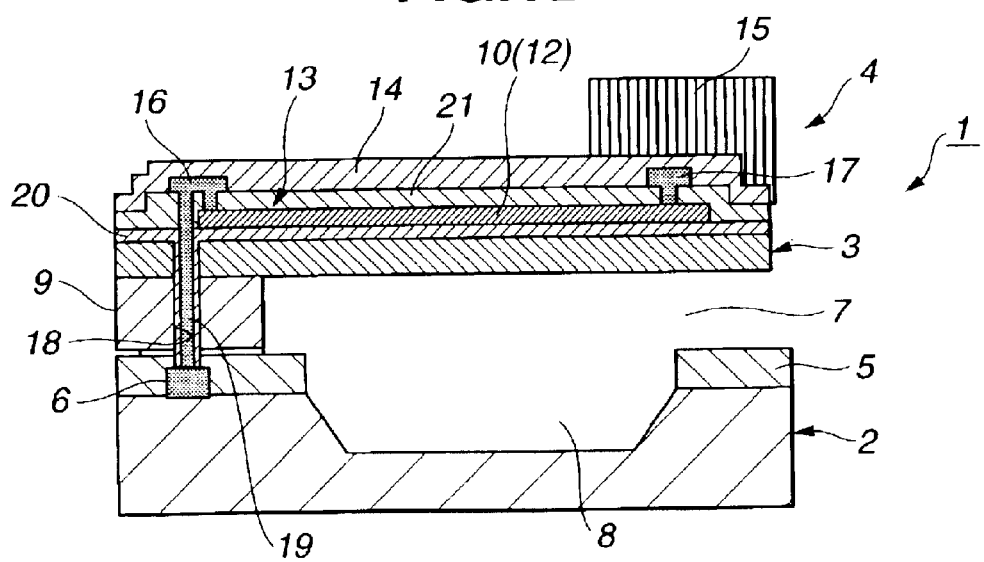
FIG. 1B is a cross sectional view taken on the lines IB—IB of FIG. 1A.

An embodiment of the thermal type-infrared detection device according to this invention is shown in FIG. 1 to FIG. 3, FIG. 1A is a top view of an infrared detection device of thermopile type, and FIG. 1B is a cross sectional view taken on the lines IB—IB of FIG.1A.

The infrared detection device 1 is provided, as shown in FIG. 1, with a silicon substrate 2 as a semiconductor substrate, a diaphragm 3 having a beam made of a silicon nitride film as an insulation material, and an infrared detection section 4 positioned on the diaphragm 3.

The silicon substrate 2 is provided with lead wires 6 protected by an insulation layer 5 composed of a composite layer of a silicon oxide film or a composite layer of a silicon oxide film and a silicon nitride film or so, and a concave 8 formed by etching and removing a part of the silicon substrate 2 with silicon etchant infiltrated through an etching aperture 7. The diaphragm 3 is thermally isolated from the concave 8 in the silicon substrate 2 through a pillar-shaped projection 9 made of a thermal conductor.

The infrared detection section 4 on the diaphragm 3 is provided with a thermopile 13 formed by electrically connecting in series a plurality of thermocouples 12 disposed in parallel, which are composed of pair of n-type semiconductors 10 (e.g. n-type polysilicon) and p-type semiconductor 11 (e.g. p-type polysilicon) and a gold-black film 15 as a heat absorption film stacked on the thermopile 13 through an insulation layer 14. In this time, an adhesive layer excellent in an affinity for gold, such as a nickel layer or so, may be formed under the gold-black film 15.

The lead wires 6 and a cold junction 16 of the thermocouples 12 which are formed on the side of the silicon substrate 2 and made of metallic material with high-melting point, such as Mo, W, Ti or the like, or silicon compounds of these elements for example, are electrically connected through aluminum wires 19 passing through a through hole 18 formed in the diaphragm 3 and the projection 9, the aluminum wires 19 in the through hole 18 covered with an insulation layer 20 formed between diaphragm 3 and thermocouples 12, and the cold junction 16 and a hot junction 17 of the thermocouples 12 are covered with the insulation layer 14 and an insulation layer 21 formed on the thermocouples 12.

Figure 2A:
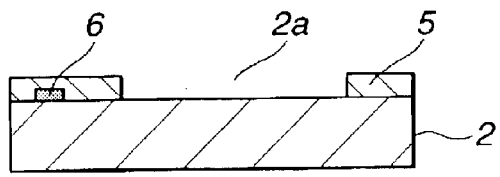
FIGS. 2A–2E are a cross sectional view illustrating the production process of the thermal type-infrared detection device shown in FIG. 1.

At the time of producing the aforementioned infrared detection device 1, an aperture 2a is formed for applying anistropic etching to the silicon substrate 2 by removing a part of insulation layer 5 protecting the lead wires 6 of the silicon substrate 2 in the first place, as shown in FIG. 2A.

Although the lead wires 6 is formed of the metallic material with high-melting point, such as Mo, W, Ti or the like, or silicon compounds of these elements for example, another materials may be applied so far as it can stand high temperature in the following process. Moreover, the insulation layer 5 is composed of the composite layer of silicon oxide films and/or silicon oxide films, however it is not limited merely to these materials so long as the wires 6 and circuits can be protected.

Figure 2B:
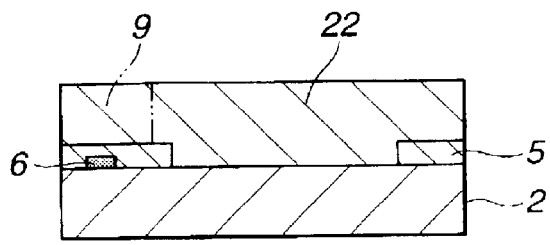

Then, a polysilicon layer 22 which is serves as the projection 9 and an etching sacrifice layer is formed on the whole surface of the silicon substrate 2 including the insulation layer 5, as shown in FIG. 2B through CVD (chemical vapor deposition) method, for example. In this state, polycrystal silicon of the polysilicon layer 22 is in contact directly with single crystal silicon of the silicon substrate 2 at the aperture 2a for the anistropic etching.

Figure 2C:
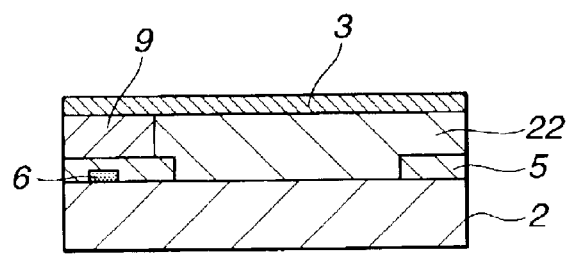

Next, anti-etching treatment is subjected to the polysilicon layer (etching sacrifice layer) 22 in order to form the projection 9 by preventing one part of the sacrifice layer to be etched in the following etching process. That is, a p-type semiconductor is formed by doping impurities such as B⁺ in high concentration at the position corresponding to the projection 9 as shown in FIG. 2C. Successively, the diaphragm 3 made of a silicon nitride film is formed on the projection 9 and the polysilicon layer 22 through the low-pressure CVD method, for example.

Other than the aforementioned method of high-concentration doping of the impurities, it is also possible to adopt a method of forming a material having resistance against the polysilicon etchant, such as a silicon oxide film around the projection 9. Moreover, in a case where the thermal conductor forming the projection 9 is a metallic material, that is a material causing no trouble in the following processes, such as nickel, titanium or so, it is possible to form a material having resistance against both the metal etchant and the silicon etchant (anisotropic etchant), such as the silicon oxide film around the projection 9.

Figure 2D:
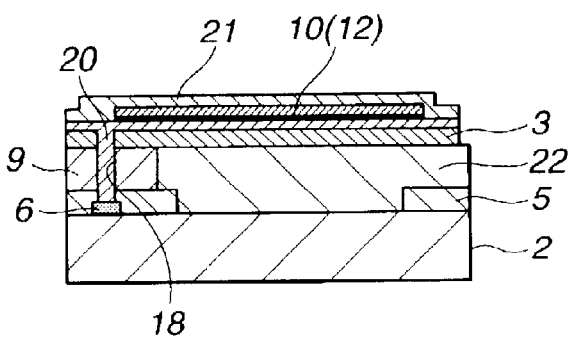

Subsequently, the through hole 18 is formed in the diaphragm 3 and the projection 9 so as to communicate a portion to be formed with the cold junction 16 to the lead wires 6 of the silicon substrate 2 as shown in FIG. 2D, and the insulation layer 20 (silicon oxide film, for example) is formed on the diaphragm 3 including the through hole 18, successively a polysilicon layer is formed on the insulation layer 20. After forming the thermocouples 12 composed of the n-type polysilicon 10 and the p-type polysilicon 11 by doping the impurities in the aforementioned polysilicon layer, the insulation layer 21 are formed again. In this embodiment, although the thermopile 13 is formed by connecting a plurality of the pairs of thermocouples 12 composed of the n-type polysilicon 10 and the p-type polysilicon 11, it is also possible to use the other combination of thermocouple such as pairing of metal and semiconductor, for example.

Figure 2E:
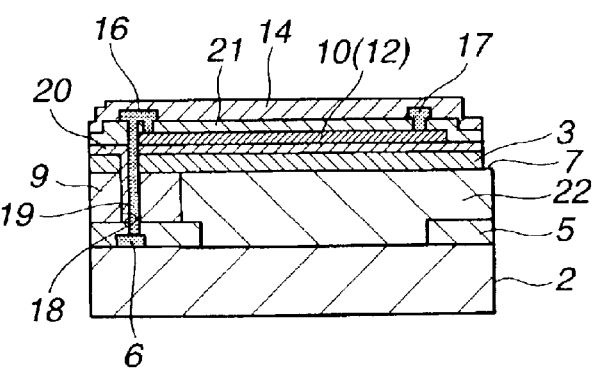

Then the aluminum wires 19 are disposed in the through hole 18 of the projection 9 as shown in FIG.2E, and the insulation layer 14 is formed after respective contact holes are formed in the n-type polysilicon 10 and the p-type polysilicon 11 and the aluminum wires 19 are set up by patterning. Successively, the insulation layers 14, 21, 22 and the diaphragm 3 in the area to be formed with the etching aperture 7 are removed.

Next, by infiltrating the silicon etchant such as, for example hydrazine, into the polysilicon layer 22 as the etching sacrifice layer through the etching aperture 7, the polysilicon layer 22 is etched and removed at first, successively the silicon substrate 2 is partially removed through the anisotropic etching to form the concave 8 in the silicon substrate 2, whereby the diaphragm 3 having the beam is formed as shown in FIG. 1. Finally, the heat absorption film (preferably, film having high absorptivity in a desired wavelength range) is formed on the necessary area, thereby completing the infrared detection device 1. For example, the gold-black 15 used in this embodiment exhibits high absorptive power of infrared ray in a case of long-wave infrared in 10 $\mu$m range.

Figure 3:
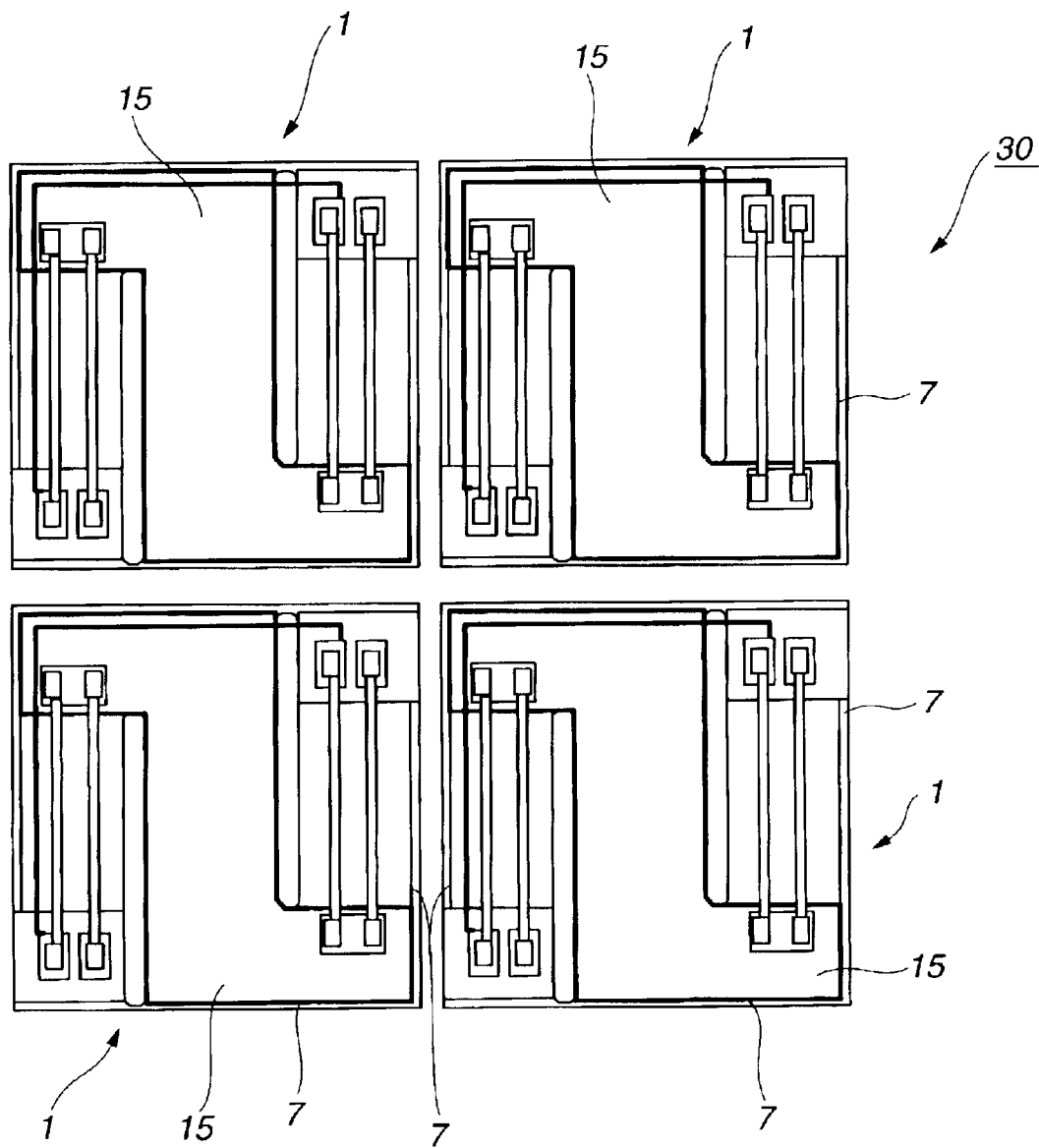
FIG. 3 is a top view illustrating the thermal type-infrared detection device array formed by arranging the plurality of detection devices shown in FIG. 1.

FIG. 3 illustrates an outline of the infrared detection device array 30 formed by two-dimensionally distributing a number of aforementioned infrared detection devices 1 in the same direction as pixels. In FIG. 3, the central portion of the etching aperture 7 situated in the outer peripheral part of the device 1 is illustrated in the size equivalent to size of the anisotropic etching in FIG. 8 in order to compare with FIG. 8 showing the conventional device array 120. The respective infrared detection devices 1 are separated by the etching apertures 7 from each other, and the projections 9 are formed below the cold junctions 16. Moreover, lead wires 6 in FIG. 1B required in the device array 30 and the switching mechanism for device selection (not shown) are formed in the silicon substrate 2.

Figure 4A:
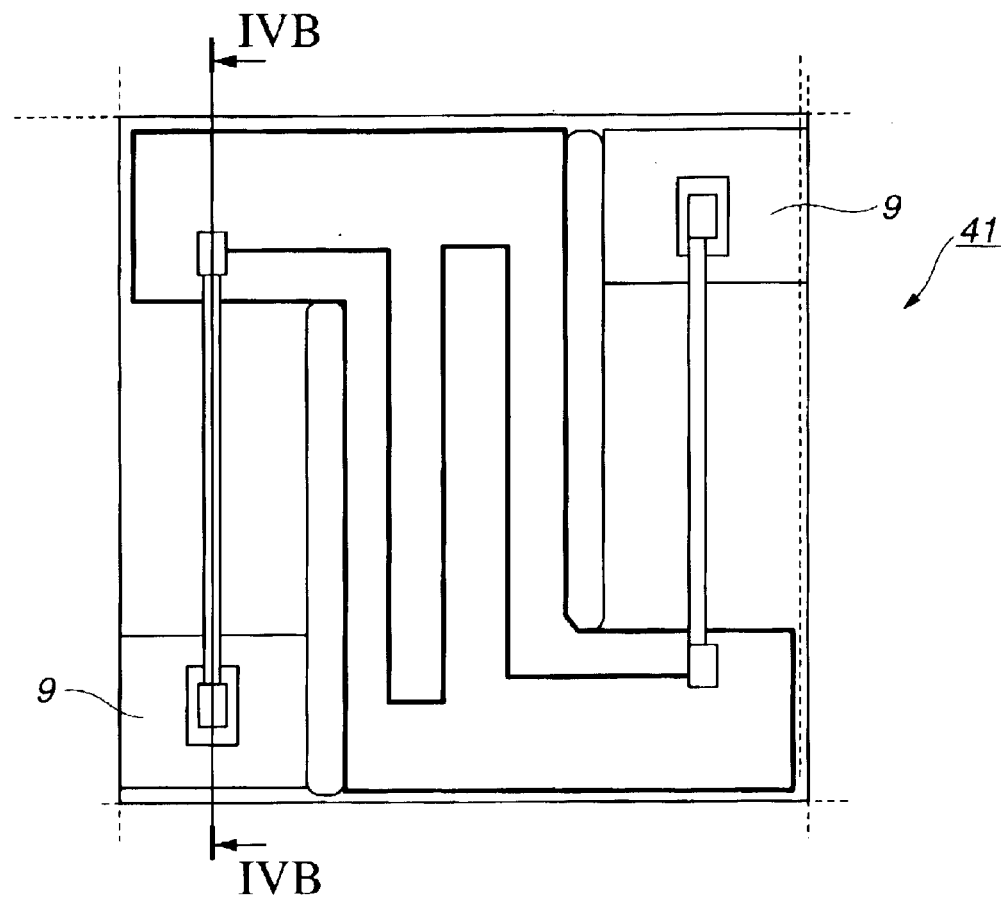
FIG. 4A is a top view illustrating another embodiment of the thermal type-infrared detection device according to this invention.
Figure 4B:
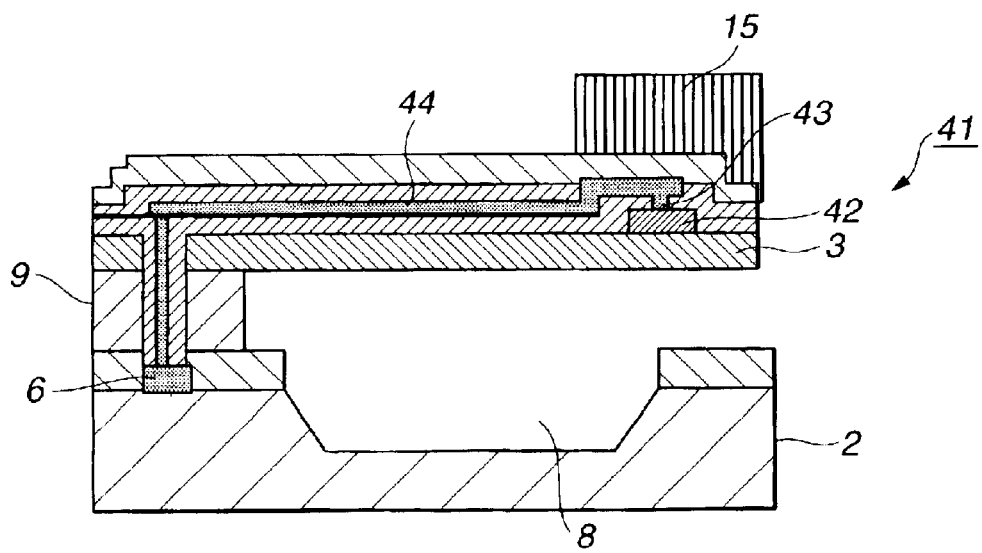
FIG. 4B is a cross sectional view taken on the lines IVB—IVB of FIG. 4A.

FIG. 4 shows another embodiment of the infrared detection device according to this invention. A bolometer type of infrared detection device is shown in this embodiment.

An infrared detection device 41 shown in FIG. 4 is different from the infrared detection device 1 of the preceding embodiment in the point that infrared detection material is made of a resistor 42 of which electric resistance is changed according to temperature changes, and the resistor 42 is connected to a contact 43 with lead wires 44. As the resistor 42, any material can be used so long as the electric resistance is changed according to temperature changes, and metallic films such as titanium and semiconductor oxides such as $VO_2$ may be used, for example. The resistor 42 is connected to the lead wires 6 on the silicon substrate 2 through the lead wires 44.

Figure 5A:
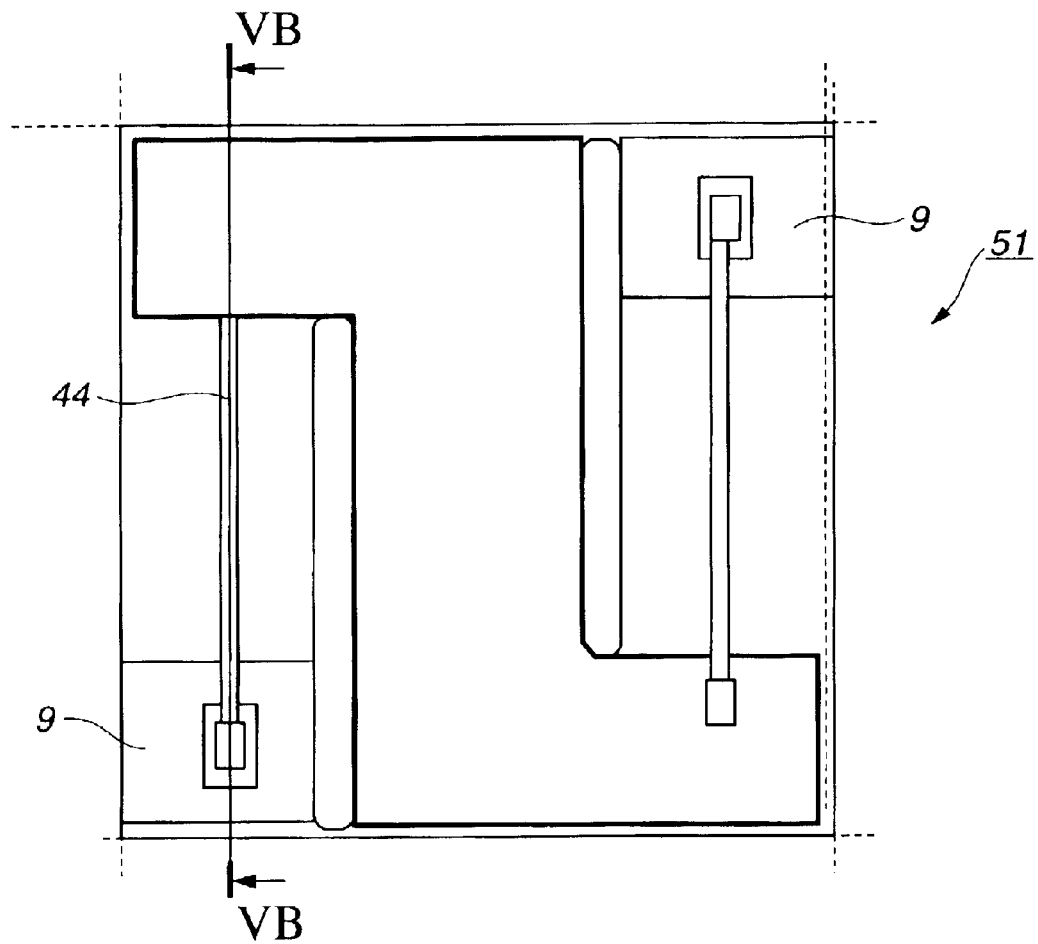
FIG. 5A is a top view illustrating the other embodiment of the thermal type-infrared detection device according to this invention.
Figure 5B:
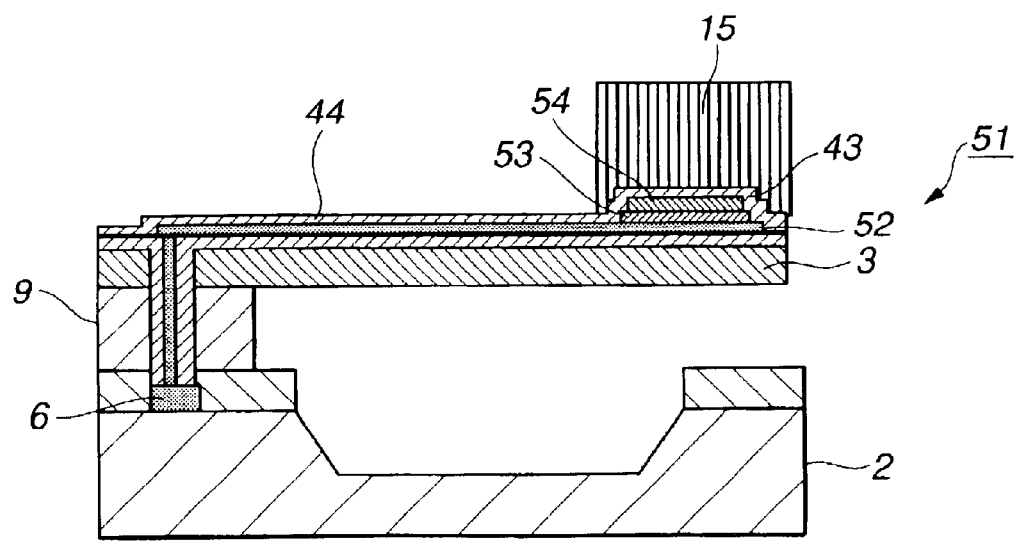
FIG. 5B is a cross sectional view taken on the lines VB—VB of FIG. 5A.

FIG. 5 illustrates the other embodiment of the infrared detection device according to this invention. A pyroelectric type of infrared detection device is shown in this embodiment.

An infrared detection device 51 shown in FIG. 5 is different from infrared detection device 41 of the bolometer type shown in FIG. 4 the point that a lower electrode 52 made of Pt/TiN/Ti, Ir/TiN/Ti or the like and formed on the diaphragm 3 is formed on the contact 43, pyroelectric material 53 such as PbTiO$_3$, PZT (PbZrO$_3$—PbTiO$_3$) or the like is formed on the lower electrode 52, further an upper electrode 54 made of the above-mentioned electrode materials or aluminum and the heat absorption layer 15 are formed. In this device, the heat absorption layer 15 becomes unnecessary if NiCr or the like relatively excellent in the heat absorption efficiency is used as the upper electrode. Moreover, it becomes easy to form a C-axis oriented film by forming oxide films, such as MgO or so as a foundation film on the diaphragm 3 at the time of forming the pyroelectric material. As the lower electrode 52, any material can be used so long as it makes the pyroelectric material into C-axis orientation. Furthermore, the other materials excepting the aforementioned materials may be also used as the pyroelectric material.

Figure 6:
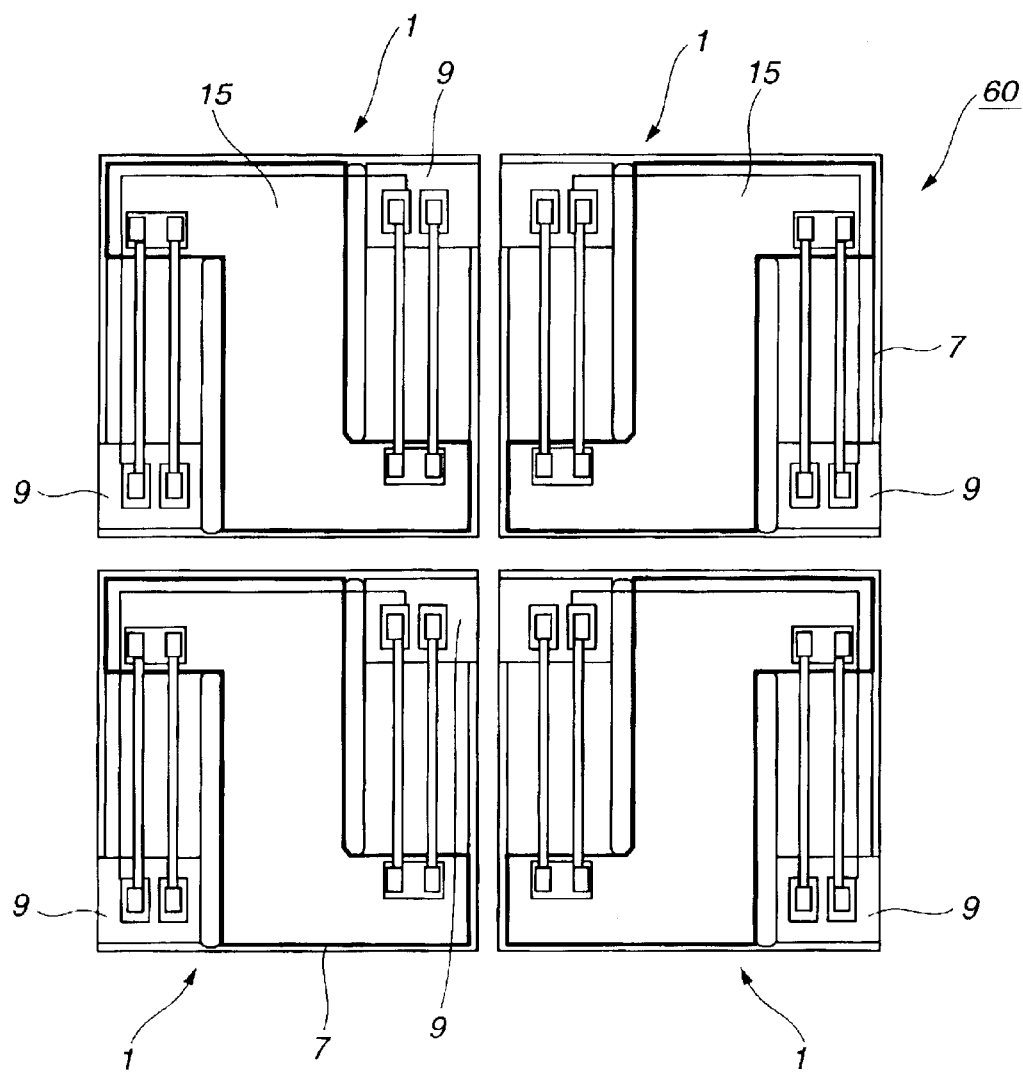
FIG. 6 is a top view illustrating another example of arrangement of the devices in the thermal type-infrared detection device array shown in FIG. 3.
Figure 7A:
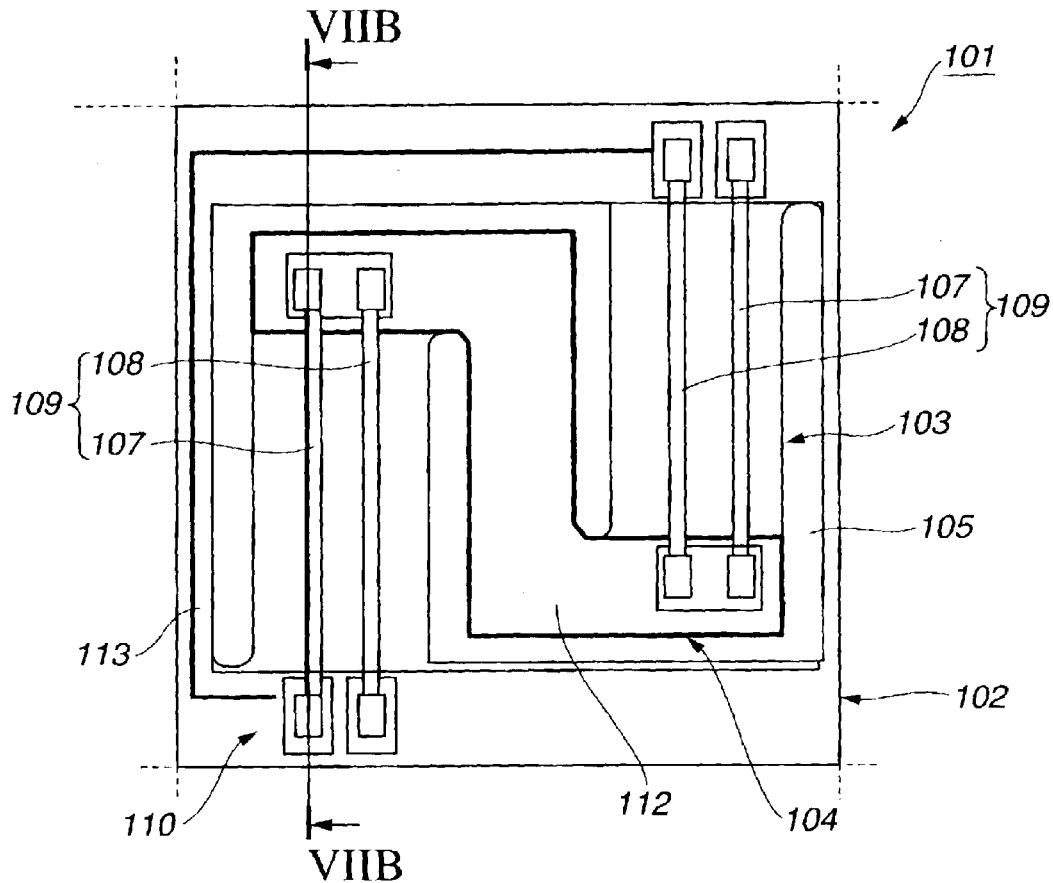
FIG. 7A is a top view illustrating the conventional thermal type-infrared detection device.
Figure 7B:
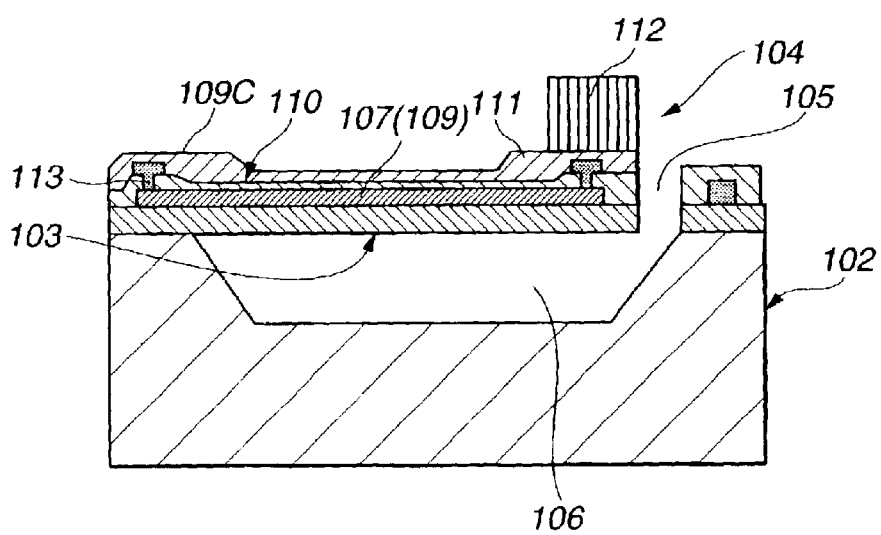
FIG. 7B is a cross sectional view taken on the lines IIVB—IIVB of FIG. 7A.

FIG. 6 shows another embodiment of the infrared detection device array according to this invention, An infrared detection device array 60 of this embodiment is different from the infrared detection device array 30 of the preceding embodiment in the point that the respective projections 9 of the thermal type-infrared detection devices 1 adjacent to each other is formed in a continuous one body.

Although the case in which two projections 9 are incorporated in the united one body, it is also possible to form three projections 9 of three thermal type-infrared detection devices 1 adjacent to each other in the united one body, and further possible to form four projections 9 in the united one body in four thermal type-infrared detection devices 1 adjacent to each other. Moreover, it is possible to apply these incorporating methods at the same time to the infrared detection devices array.

As described above, according to the thermal type infrared detection device of this invention, it is possible to remarkably increase the fill factor without harming mechanical strength of the diaphragm, and an excellent effect can be obtained in that it is possible to improve the output power of the detection signal.

Especially, in the thermal type-infrared detection device provided with a projection made of a silicon-polycrystalline material according to the preferable embodiment of this invention, it is possible to avoid deterioration of yield rate at the time of forming the diaphragm.

Moreover, in the method for producing the thermal type-infrared detection device according to this invention, the isotropic etching of the sacrifice layer and the anisotropic etching of the semiconductor substrate can be carried out continuously, and it is possible to set the distance between diaphragm and semiconductor substrate widely in this time, therefore an excellent effect can be obtained in that it is possible to avoid the sticking phenomenon and control the height of the projection low.

Further, in the array of thermal type-infrared detection device according to this invention, the fill factor of the individual thermal type-infrared detection device is drastically improved, thereby decreasing the occupied area of the pixel, accordingly, it is possible to realize reduction of the area of the whole body of the device array. In addition to above, it is possible to reduce the useless area between the pixels by forming the address wiring of the device array on the semiconductor substrate under the projection, therefore an excellent effect can be obtained in that it is possible to actualize further reduction of the area of the device array and retrenchment of the cost of the array.

Furthermore, in the array of thermal type-infrared detection device according to a preferred embodiment of this invention, the useless area is reduced between the devices, whereby the occupied area of one pixel is further reduced, consequently it is possible realize further retrenchment of the cost of the device array.

What is claimed is:

1. A thermal type-infrared detection device, comprising:
   a semiconductor substrate having a concave, wires and electronic circuits;
   a diaphragm made of an insulating material, disposed above the semiconductor substrate and substantially covering the concave of said semiconductor substrate; and
   an infrared detecting section positioned on said diaphragm for transforming thermal energy into electric energy, wherein
      said semiconductor substrate is provided with a projection made of a thermal conductor for supporting said diaphragm away from the semiconductor substrate, and
      said projection includes wires connecting said infrared detection section and the wires provided in said semiconductor substrate.

2. A thermal type-infrared detection device according to claim 1, wherein said thermal conductor is made of silicon-polycrystalline material.

3. A thermal type-infrared detection device according to claim 1, wherein said thermal conductor is made of metallic material.

4. A thermal type-infrared detection device according to claim 1, wherein said device is any one of a thermopile type, a bolometer type and a pyroelectric type.

5. A method for producing the thermal type-infrared detection device according to claim 1, comprising the steps of:
   preparing a semiconductor substrate formed with a first insulation layer on the surface thereof;
   removing a part of the first insulation layer of said semiconductor substrate to form an aperture for anisotropic etching of said semiconductor substrate;
   stacking an etching sacrifice layer on a whole surface including the first insulation layer on said semiconductor substrate and the aperture of said first insulation layer;
   stacking a diaphragm and a second insulation layer on said etching sacrifice layer in order;
   infiltrating etchant into the etching sacrifice layer after taking a measure for making said etching sacrifice layer withstand the etchant at a position to be formed with said projection;
   etching and removing said etching sacrifice layer excepting the position corresponding to said projection; and
   removing a part of said semiconductor substrate to form said concave through anisotropic etching by infiltrating anisotropic etchant through the aperture of said first insulation layer on the semiconductor substrate.

6. An array of thermal type-infrared detection device composed of a plurality of said detection devices according to claim 1 are arranged with each other.

7. An array of thermal type-infrared detection device according to claim 1, wherein projections adjacent to each other of the respective devices are formed in continuous one body.

* * * * *